US011489222B2

(12) United States Patent
Kim

(10) Patent No.: US 11,489,222 B2
(45) Date of Patent: Nov. 1, 2022

(54) SECONDARY BATTERY

(71) Applicant: Samsung SDI Co., Ltd., Yongin-si (KR)

(72) Inventor: Joong Hun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 162 days.

(21) Appl. No.: 16/490,840

(22) PCT Filed: Feb. 6, 2018

(86) PCT No.: PCT/KR2018/001615
§ 371 (c)(1),
(2) Date: Sep. 3, 2019

(87) PCT Pub. No.: WO2018/164379
PCT Pub. Date: Sep. 13, 2018

(65) Prior Publication Data
US 2020/0006721 A1 Jan. 2, 2020

(30) Foreign Application Priority Data

Mar. 6, 2017 (KR) .................. 10-2017-0028523

(51) Int. Cl.
*H01M 50/172* (2021.01)
*H01M 50/147* (2021.01)
(Continued)

(52) U.S. Cl.
CPC ....... *H01M 50/172* (2021.01); *H01M 50/147* (2021.01); *H01M 50/531* (2021.01); *H01M 50/543* (2021.01)

(58) Field of Classification Search
CPC combination set(s) only.
See application file for complete search history.

(56) References Cited

U.S. PATENT DOCUMENTS 8,057,931 B2   11/2011   Bjork
8,486,557 B2   7/2013    Lee et al.
(Continued)

FOREIGN PATENT DOCUMENTS

CN    201364930 Y    12/2009
CN    101752601 A    6/2010
(Continued)

OTHER PUBLICATIONS

English translation of KR-20150144600-A (Year: 2015).*
(Continued)

*Primary Examiner* — Ula C Ruddock
*Assistant Examiner* — Sarika Gupta
(74) *Attorney, Agent, or Firm* — Lewis Roca Rothgerber Christie LLP

(57) ABSTRACT

A secondary battery has a simplified structure of a terminal part to reduce the number of parts, and terminal parts can be directly connected without requiring a separate part (for example, a bus bar) for mutual electrical connection between a battery and another battery. A secondary battery comprises: an electrode assembly, a case for accommodating the electrode assembly; a cap plate coupled to the case; and a terminal part that is electrically connected to the electrode assembly and is extended to penetrate through the cap plate, wherein the terminal part comprises a first area having a first thickness that is electrically connected to the electrode assembly from the inside of the case, and a second area having a second thickness that is thicker than the first thickness and is electrically connected to the first area from the outer side of the case.

7 Claims, 9 Drawing Sheets

(51) Int. Cl.
*H01M 50/531* (2021.01)
*H01M 50/543* (2021.01)

(56) References Cited

U.S. PATENT DOCUMENTS

| | | | |
|---|---|---|---|
| 8,999,568 | B2 | 4/2015 | Guen |
| 9,023,517 | B2 | 5/2015 | Kim et al. |
| 9,300,013 | B2 | 3/2016 | Yoon et al. |
| 9,660,249 | B2 | 5/2017 | Byun et al. |
| 9,680,136 | B2 | 6/2017 | Yoo et al. |
| 10,033,026 | B2 | 7/2018 | Jang et al. |
| 2009/0159311 | A1* | 6/2009 | Zheng ................ H01M 10/647 174/9 R |
| 2011/0123868 | A1 | 5/2011 | Kawaoka et al. |
| 2012/0058389 | A1 | 3/2012 | Guen |
| 2012/0094161 | A1 | 4/2012 | Zheng |
| 2012/0183840 | A1 | 7/2012 | Lee et al. |
| 2012/0189899 | A1 | 7/2012 | Kanda et al. |
| 2013/0252078 | A1 | 9/2013 | Kim et al. |
| 2015/0044543 | A1 | 2/2015 | Yoon et al. |
| 2015/0093610 | A1 | 4/2015 | Byun et al. |
| 2015/0364731 | A1 | 12/2015 | Yoo et al. |
| 2016/0248073 | A1* | 8/2016 | Jang .................... H01M 50/531 |
| 2019/0319295 | A1 | 10/2019 | Kim et al. |

FOREIGN PATENT DOCUMENTS

| | | | |
|---|---|---|---|
| CN | 101877413 | A | 11/2010 |
| CN | 102754240 | A | 10/2012 |
| CN | 202930467 | U | 5/2013 |
| CN | 104112840 | A | 10/2014 |
| CN | 104518192 | A | 4/2015 |
| CN | 105304853 | A | 2/2016 |
| EP | 3531476 | A1 | 8/2019 |
| JP | 2014-026798 | A | 2/2014 |
| JP | 2014-132594 | A | 7/2014 |
| JP | 2014-220153 | A | 11/2014 |
| JP | 2016-1580 | A | 1/2016 |
| JP | 2016-58215 | A | 4/2016 |
| KR | 10-2009-0093222 | | 9/2009 |
| KR | 10-2012-0025854 | A | 3/2012 |
| KR | 10-1136800 | B1 | 4/2012 |
| KR | 10-2013-0107184 | A | 10/2013 |
| KR | 10-2015-0144600 | A | 12/2015 |
| KR | 20150144600 | A * | 12/2015 ............ H01M 50/00 |
| KR | 10-2016-0103453 | A | 9/2016 |
| KR | 10-1657334 | B1 | 9/2016 |
| WO | WO 2010/064288 | A1 | 6/2010 |

OTHER PUBLICATIONS

EPO Extended European Search Report dated Nov. 4, 2020, issued in corresponding European Patent Application No. 18764478.6 (6 pages).
Chinese First Office action dated Sep. 2, 2021 issued in corresponding CN Application No. 201880016363.0, 10 pages, with English translation, 12 pages.
Notice of Allowance dated Dec. 27, 2021 issued in corresponding Korean Application No. 10-2017-0028523, 2 pages.
Chinese Office Action in corresponding Chinese Patent Application No. 201880016363.0, Chinese Office Action dated Apr. 12, 2022, with English Translation (23 pgs.).
Chinese Office Action dated Aug. 23, 2022, issued in corresponding Chinese Patent Application No. 201880016363.0 with English translation, 24 pages.

* cited by examiner

SECONDARY BATTERY

CROSS-REFERENCE TO RELATED APPLICATION(S)

This application is a National Phase Patent Application of International Patent Application Number PCT/KR2018/001615, filed on Feb. 6, 2018, which claims priority of Korean Patent Application No. 10-2017-0028523, filed Mar. 6, 2017. The entire contents of both of which are incorporated herein by reference.

TECHNICAL FIELD

Various embodiments of the present invention relate to a secondary battery.

BACKGROUND ART

Unlike a primary battery that is not rechargeable, a secondary battery may be charged and discharged. Low capacity batteries that use single battery cells may be used as power sources for various small-sized portable electronic devices, such as, for example, smart phones and digital cameras. High power batteries that use several tens to several hundreds of battery cells connected to each other in a battery pack may be used as, e.g., driving power sources for electric scooters, hybrid vehicles, or electric vehicles.

Secondary batteries may be manufactured in various types, e.g., prismatic and cylindrical batteries. A secondary battery may be manufactured by accommodating an electrode assembly including a separator (as an insulator) interposed between a positive plate and a negative plate in a case with an electrolyte, and installing a cap plate in the case. Positive and negative electrode terminal parts may be connected to the electrode assembly and may be exposed or protrude to the outside through the cap plate.

The above information disclosed in this Background section is only for enhancement of understanding of the background of the described technology and therefore it may contain information that does not form the prior art that is already known in this country to a person of ordinary skill in the art.

Technical Problems to be Solved

The present invention has been made in an effort to solve the problems of the prior art, and the technical problem to be solved is to provide a secondary battery of which the structure of a terminal part is simplified to reduce the number of parts, and terminal parts can be directly connected without requiring a separate part (for example, a bus bar) for mutual electrical connection between a battery and another battery.

Technical Solutions

In accordance with an aspect of the present invention, the above and other objects can be accomplished by providing a secondary battery comprising an electrode assembly; a case for accommodating the electrode assembly; a cap plate coupled to the case; and a terminal part that is electrically connected to the electrode assembly and is extended to penetrate through the cap plate, wherein the terminal part comprises a first area having a first thickness that is electrically connected to the electrode assembly from the inside of the case, and a second area having a second thickness that is thicker than the first thickness and is electrically connected to the first area from the outer side of the case.

The first and second areas may be insulated from the cap plate by an insulating molding resin.

The first and second areas may be electrically connected to each other inside of the cap plate.

The first area may include a first hook area located at its top end, the second area may include a second hook area located at its bottom end, and the first hook area and the second hook area may be coupled to each other.

The first area may be bent in a C- or S-shaped configuration.

The first area may be connected to a single tab or multi-tabs extending from the electrode assembly.

The second area may be bent in parallel with the cap plate.

The second area may be bent in parallel with the cap plate to then be welded to a second area of another secondary battery.

An insulation plate that withstands welding heat may be positioned between the second area and the cap plate.

Advantageous Effects

As described above, various embodiments of the present invention provide a secondary battery, which can reduce the number of parts by simplifying the structure of a terminal part, and can directly connect terminal parts without requiring a separate part (for example, a bus bar) for mutual electrical connection between a battery and another battery.

That is to say, according to various embodiments of the present invention, the terminal part having a plate-shaped first area and a plate-shaped second area is combined with the cap plate, followed by insert-molding using an insulating molding resin, thereby simplifying the structure of the terminal part to reduce the number of parts.

In addition, according to various embodiments of the present invention, the plate-shaped first area of the terminal part is made to have a smaller thickness than the plate-shaped second area, and the relatively thin first area of the terminal part is welded to the electrode assembly, thereby allowing the first area to be easily bent.

In addition, according to various embodiments of the present invention, the plate-shaped terminal part is protruded and extended to the outside of the case, thereby plate-shaped terminal parts of neighboring secondary batteries to be easily welded to each other without a bus bar.

In addition, according to various embodiments of the present invention, in a battery module having terminal parts connected to each other, an insulation plate is further positioned between each of terminal parts and the case, thereby preventing unnecessary electrical short circuits from occurring between the terminal parts and the case.

BEST MODE FOR CARRYING OUT THE INVENTION

Figure 1A:
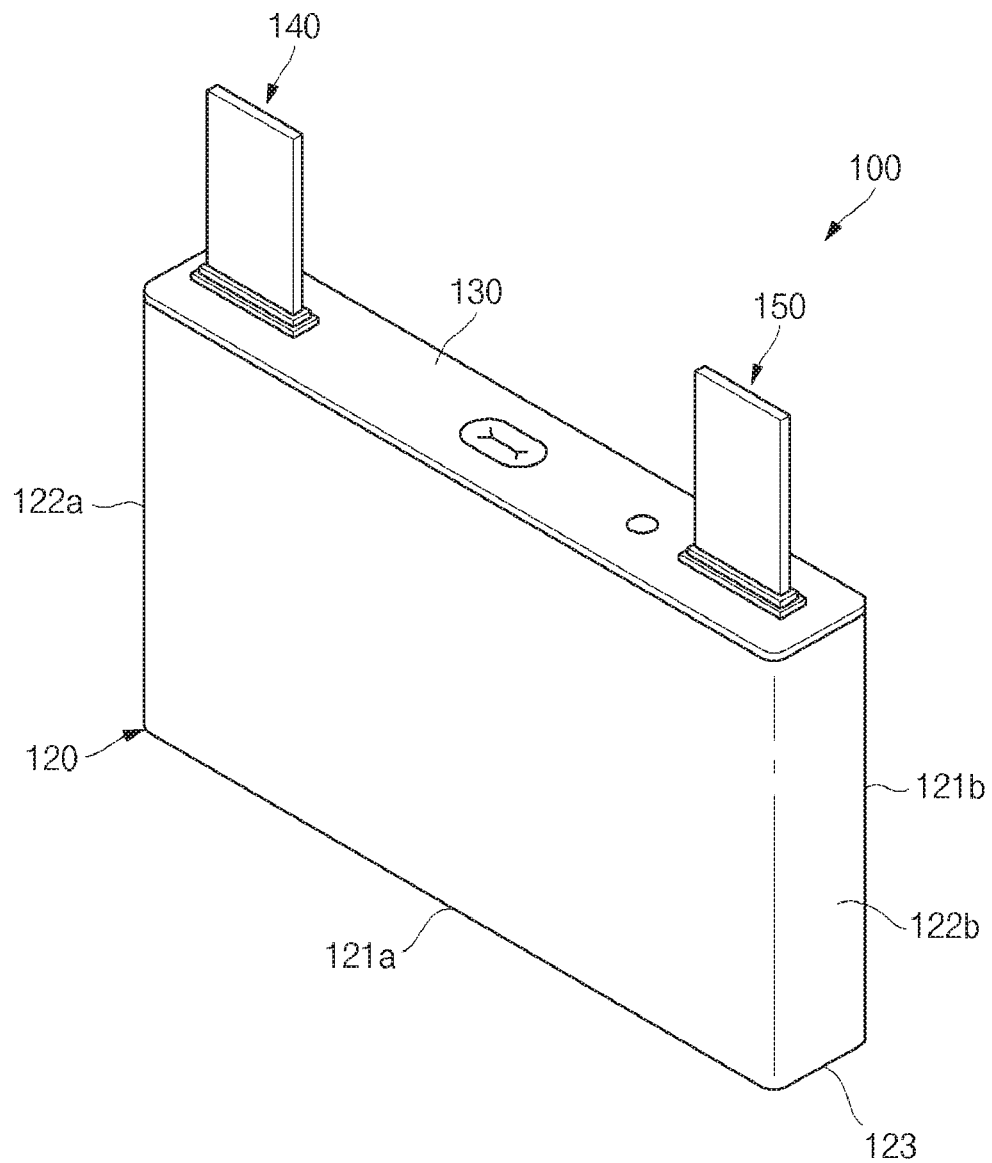
FIGS. 1A to 1D are a perspective view, a front sectional view, a side sectional view and an enlarged sectional view of a secondary battery according to various embodiments of the present invention.
Figure 1B:
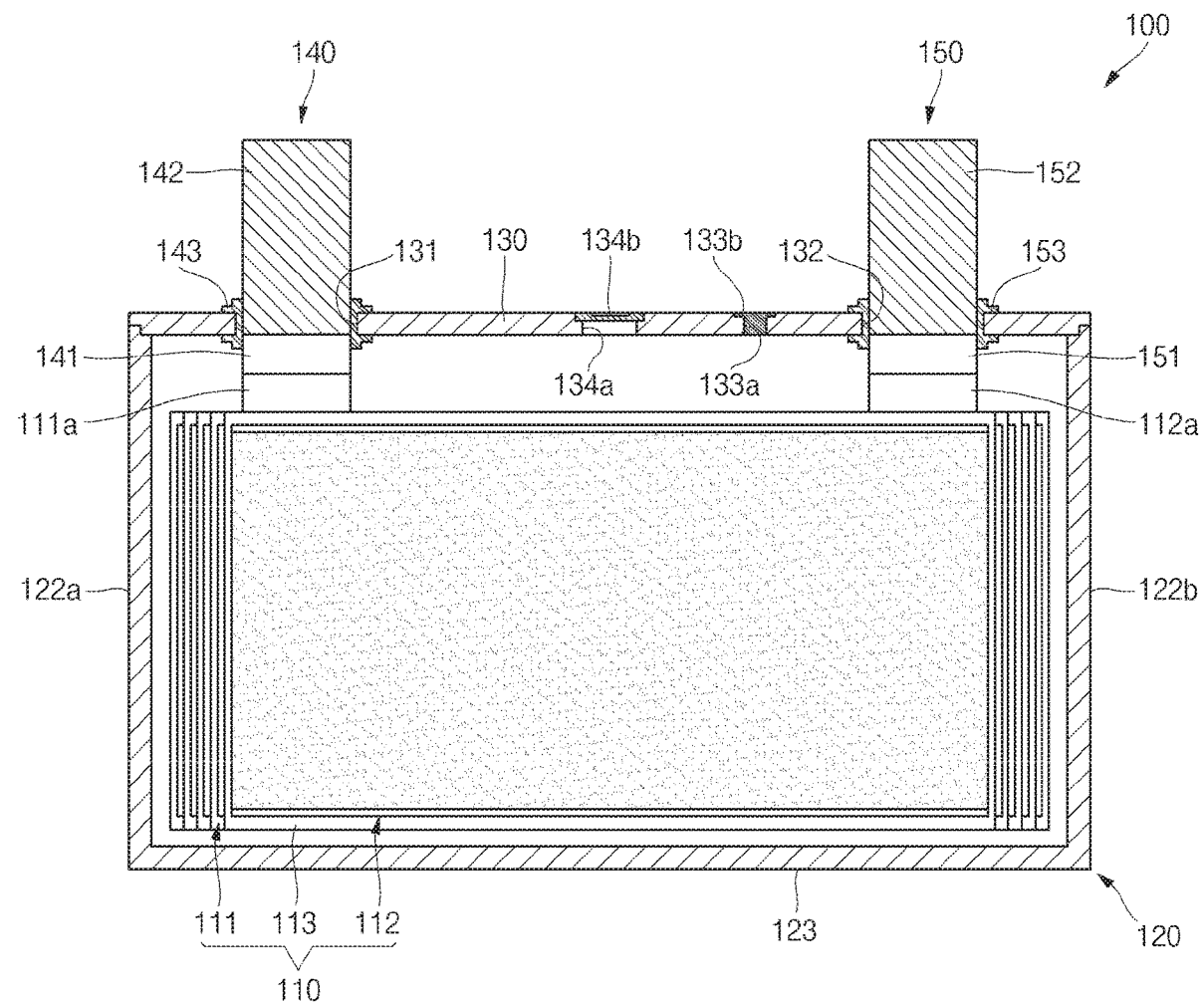
Figure 1C:
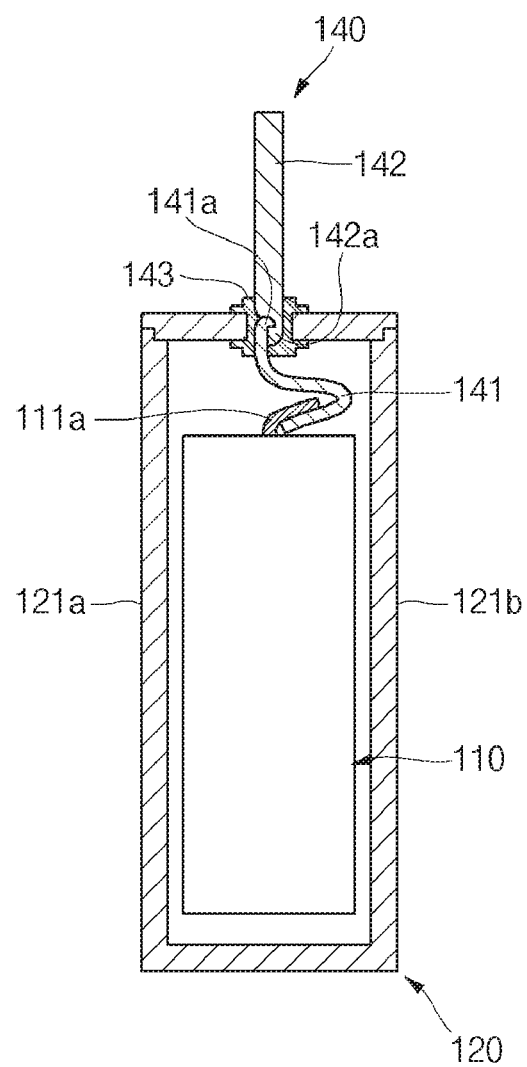
Figure 1D:
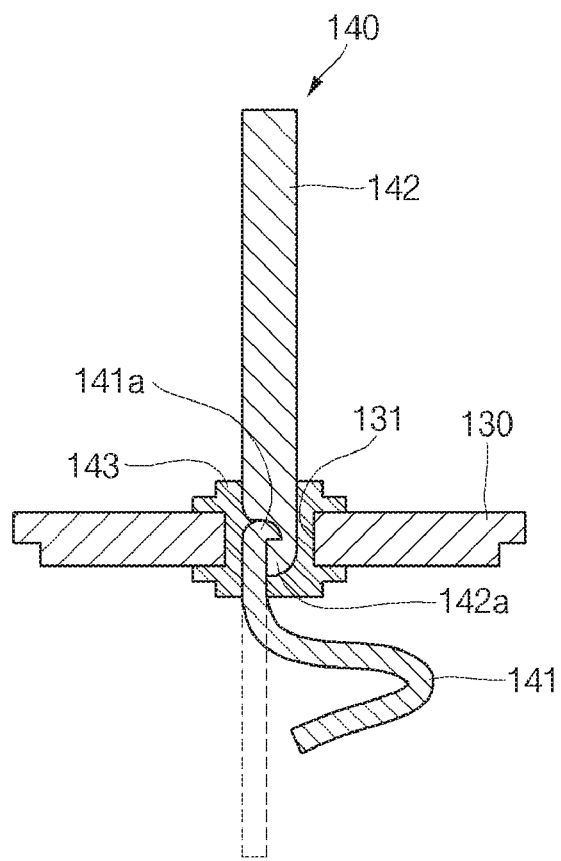

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

FIGS. 1A to 1D are a perspective view, a front sectional view, a side sectional view and an enlarged sectional view of a secondary battery 100 according to various embodiments of the present invention.

As illustrated in FIGS. 1A to 1D, the secondary battery 100 according to an embodiment of the present invention includes an electrode assembly 110, a case 120, a cap plate 130, a first terminal part 140 and a second terminal part 150.

The electrode assembly 110 is formed by winding or stacking a stacked structure including a first electrode plate 111, a separator 113, and a second electrode plate 112, which are thin plates or layers. Here, the first electrode plate 111 may operate as a positive electrode and the second electrode plate 112 may operate as a negative electrode, and vice versa.

The first electrode plate 111 may be formed by coating a first electrode active material, such as transition metal oxide, on a first electrode current collector formed of, for example, but not limited to, a metal foil, such as aluminum, and may include a first tab 111a (either a single tab or multi-tabs) upwardly extending a predetermined length without the first electrode active material coated thereon. The first tab 111a becomes a path for the flow of current between the first electrode plate 111 and a first terminal part 140 to be described below.

The second electrode plate 112 may be formed by coating a second electrode active material, such as graphite or carbon, on a second electrode current collector formed of, for example, but not limited to, a metal foil, such as copper or nickel, and may include a second tab 112a (either a single tab or multi-tabs) upwardly extending a predetermined length without the second electrode active material coated thereon. The second tab 112a becomes a path for the flow of current between the second electrode plate 112 and a second terminal part 150 to be described below.

Polarities of the first electrode plate 111 and the second electrode plate 112 may be reversed. In addition, the first and second tabs 111a and 112a may have a single tab structure in which one of the first and second tabs 111a and 112a is upwardly extended from the first and second electrode plates 111 and 112 or a multi-tab structure in which multiple tabs are upwardly extended from the first and second electrode plates 111 and 112. The multi-tab structure is thicker than the single-tab structure due to overlapping of the tabs.

The separator 113, which is positioned between, for example, but not limited to, the first and second electrode plates 111 and 112, may prevent electrical short circuits between the first and second electrode plates 111 and 112, and may allow lithium ions to move. The separator 113 may include polyethylene, polypropylene, or a combined film of polypropylene and polyethylene. In addition, when an organic solid electrolyte, an organic-inorganic hybrid solid electrolyte, or an inorganic solid electrolyte is positioned between the first electrode plate 111 and the second electrode plate 112, the separator 113 may not be provided.

The electrode assembly 110 may be received in the case 120 with, for example, but not limited to, an electrolyte solution. The electrolyte solution may include a lithium salt, such as $LiPF_6$ or $LiBF_4$ dissolved in an organic solvent, such as ethylene carbonate (EC), propylene carbonate (PC), diethyl carbonate (DEC), ethyl methyl carbonate (EMC), or dimethyl carbonate (DMC). In addition, the electrolyte solution may be in a liquid, solid or gel phase.

The case 120 may be made of, for example, but not limited to, a conductive metal, such as aluminum, an aluminum alloy, steel, a steel alloy, nickel plated steel, or a nickel plated steel alloy, and may have an approximately hexahedral shape having an opening through which some portions of the electrode assembly 110, the first terminal part 140 and the second terminal part 150 are inserted and placed. More specifically, the case 120 includes a pair of long side regions 121a and 121b having relatively areas, a pair of short side regions 122a and 122b connecting the pair of long side regions 121a and 121b and having relatively areas, and a bottom region 123 connecting the long side regions 121a and 121b and the short side regions 122a and 122b. Here, the first tab 111a of the electrode assembly 110 is extended a predetermined length in a direction opposite to the bottom region 123 (that is, in an upward direction), and the second tab 111b is also extended a predetermined length in the direction opposite to the bottom region 123 (that is, in the upward direction). In addition, the first terminal part 140 may be located in vicinity of the short side region 122a of the case 120, and the second terminal part 150 may be located in vicinity of the short side region 122b of the case 120.

Meanwhile, the interior surface of the case 120 may be subjected to insulation treatment such that it is electrically isolated from the electrode assembly 110, the first terminal part 140 and the second terminal part 150. Of course, the electrode assembly 110, the first terminal part 140 and the second terminal part 150 may be positioned inside of the case 120 while being received in an insulation bag (not shown).

The cap plate 130 may be coupled to the opened top portion of the case 120 by, for example, laser welding, but embodiments of the present invention are not limited thereto. Therefore, the case 120 and the cap plate 130 are electrically connected to each other. In addition, the cap plate 130 and the case 120 may be made of the same material. Here, the cap plate 130 and the first terminal part 140 may be electrically connected to each other. Accordingly, the cap plate 130 may have the same polarity with the first terminal part 140. Therefore, the case 120 and the cap plate 130 may have the same polarity. Conversely, the cap plate 130 and the second terminal part 150 may be electrically connected to each other. Accordingly, the cap plate 130 and the case 120 may have the same polarity with the second terminal part 150. Of course, the first terminal part 140 and the second terminal part 150 may not be electrically connected to the cap plate 130 at the same time.

The cap plate 130 includes a first terminal hole 131 through which the first terminal part 140 passes, and a second terminal hole 132 through which the second terminal part 150 passes. In addition, the cap plate 130 may further include an injection hole 133a for supplying the electrolyte solution and a plug 133b coupled to the injection hole 133a. In addition, the cap plate 130 may include a vent hole 134a configured to allow internal gases to be easily discharged to the outside when the internal pressure of the case 120 is greater than a reference pressure, and a safety vent 134b coupled to the vent hole 134a having a relatively small thickness.

The first terminal part 140 is electrically connected to the first tab 111a of the electrode assembly 110 and includes a first area 141 and a second area 142 upwardly extended a predetermined length while passing through the first terminal hole 131 of the cap plate 130. In addition, the first terminal part 140 further includes an insulating molding resin 143 in the first terminal hole 131 and on the surface of the cap plate 130 around the first terminal hole 131.

The first area 141 is substantially plate-shaped and is generally located inside of the case 120 to be electrically connected to the first tab 111a of the electrode assembly 110. In addition, the first area 141 may be bent in a roughly C- or S-shaped configuration inside of the case 120, which is an upper portion of the electrode assembly 110. In addition, a top end of the first area 141 is connected to a bottom end of the second area 142. Here, the first area 141 may be mainly bent in a direction ranging from the first long side region 121a to the second long side region 121b of the case 120 or from the second long side region 121b to the first long side region 121a. In addition, as the first area 141 is bent, the first tab 111a welded to the first area 141 is also bent in a predetermined shape.

In addition, the second area 142 is substantially plate-shaped and is generally located outside of the case 120 to upwardly extend a predetermined length. The second area 142 may be directly electrically connected to a first terminal part or a second terminal part of another secondary battery in a later stage, which will further be described below.

In addition, the first area 141 may have a first thickness, and the second area 142 may have a second thickness that is larger than the first thickness. That is to say, since the first area 141 needs to be bent in a predetermined shape (for example, a C-shaped configuration, an S-shaped configuration, etc.) when the cap plate 130 is coupled to the case 120 after being electrically connected (e.g., welded) to the first tab 111a, the first thickness of the first area 141 may be smaller than the second thickness of the second area 142 (Refer to FIG. 1C.). However, since the first area 141 is thicker than the first tab 111a, the first tab 111a is easily welded to the first area 141. That is to say, in the present invention, the thickness of the first area 141 may be larger than the thickness of the first tab 111a, the thickness of the second area 142 may be larger than the thickness of the first area 141. Here, the first tab 111a and the first area 141 have ductility so as to be easily bent during the manufacture process, and the second area 142 has rigidity so as to be scarcely bent during the manufacture process. However, the second area 142 may be mechanically bent without being damaged when being welded to a second area of another battery.

In addition, the first area 141 includes a first hook area 141a located at its top end, the second area 142 includes a second hook area 142a located at its bottom end, and the first and second hook areas 141a and 142a may be coupled to each other. Here, the first and second hook areas 141a and 142a coupled to each other may be generally located inside of a first through-hole 131 of the cap plate 130. That is to say, the first and second hook areas 141a and 142a are covered by an insulating molding resin 143 (Refer to FIG. 1C.).

Here, the first and second hook areas 141a and 142a may further be welded to each other by laser welding, ultrasonic welding and/or resistance welding after being coupled/connected/compressed to each other. In addition, the first area 141 and the second area 142 may be coupled/connected/compressed/welded to each other without the first and second hook areas 141a and 142a after the top end of the first area 141 and the bottom end of the second area 142 are positioned to overlap each other.

Meanwhile, the first and second areas 141 and 142 may be made from the same material with the first tab 111a. For example, if the first tab 111a is made from aluminum or an aluminum alloy, the first and second areas 141 and 142 may also be made from aluminum or an aluminum alloy. In addition, if the first tab 111a is made from copper, a copper alloy, nickel or a nickel alloy, the first and second areas 141 and 142 may also be made from copper, a copper alloy, nickel or a nickel alloy. As such, since the first and second areas 141 and 142 (specifically, the first area 141) and the first tab 111a are made from the same material, the first area 141 may be easily welded to the first tab 111a.

In addition, when the first tab 111a is made from copper, a copper alloy, nickel or a nickel alloy, the first area 141 may be made from copper, a copper alloy, nickel or a nickel alloy, and the second area 142 may be made from aluminum or an aluminum alloy. However, even if the first area 141 is copper- or nickel-based, since the second area 142 is aluminum-based, it can be easily welded to a terminal (e.g., an aluminum terminal, etc.) of another battery.

The insulating molding resin 143 is located in the first terminal hole 131 and covers the first terminal part 140, that is, the first and second areas 141 and 142 or the first and second hook areas 141a and 142a of the first and second areas 141 and 142. In addition, the insulating molding resin 143 is also located to a constant thickness on top and bottom surfaces of the cap plate 130 near the first terminal hole 131.

Here, the insulating molding resin 143 is preferably made from a material that is not reactive with an electrolyte and is suitable to a molding process. More specifically, the insulating molding resin 143 may be one selected from the group consisting of a fluorine resin, a polyethylene (PE) resin, a polypropylene (PP) resin, an ethylene propylene diene monomer (EPDM) resin, and equivalents thereof, but aspects of the present invention are not limited thereto.

The second terminal part 150 is electrically connected to the second tab 112a of the electrode assembly 110 and includes a first area 151 and a second area 152 upwardly extended a predetermined length while passing through the second terminal hole 132 of the cap plate 130. In addition, the second terminal part 150 further includes an insulating molding resin 153 located in the second terminal hole 132 and on the surface of the cap plate 130 around the second terminal hole 132. The configuration, shape and features of the first terminal part 140 can be commonly applied to those of the second terminal part 150, additional explanations of the second terminal part 150 will not be given.

Figure 2A:
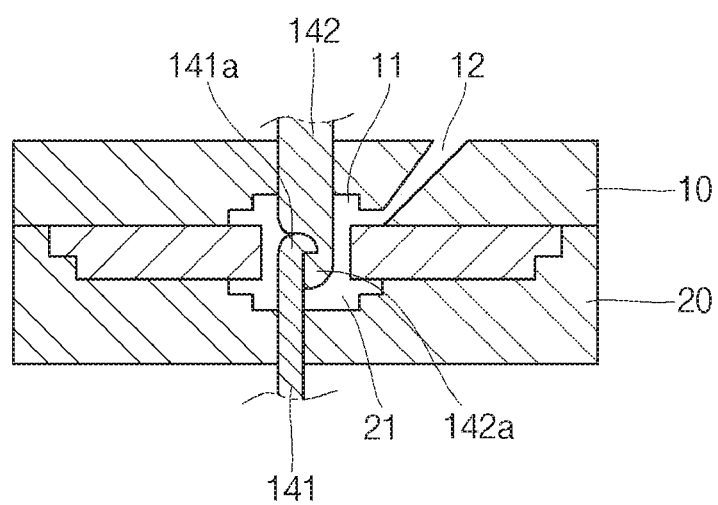
FIGS. 2A to 2C are schematic views illustrating a manufacturing method of a terminal part according to various embodiments of the present invention.
Figure 2B:
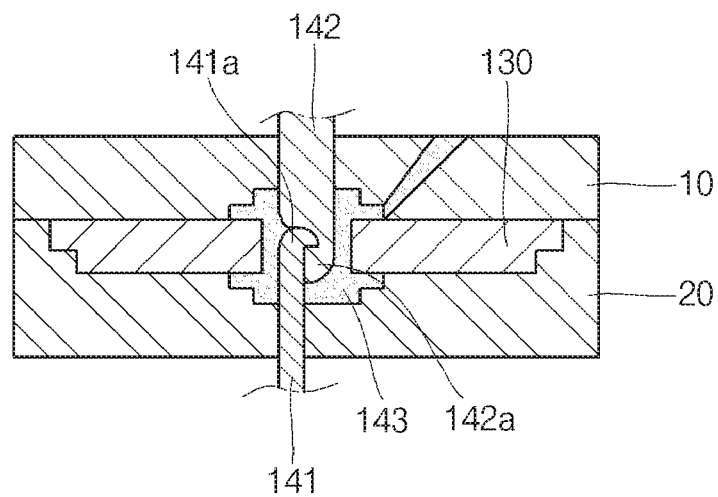
Figure 2C:
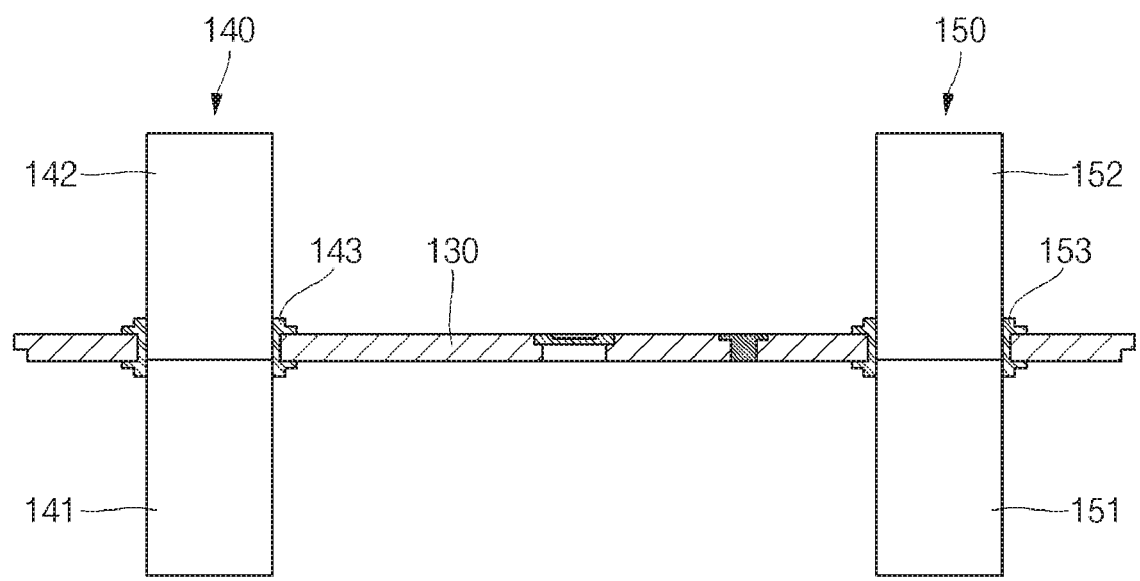

FIGS. 2A to 2C are schematic views illustrating a manufacturing method of a terminal part according to various embodiments of the present invention.

As illustrated in FIG. 2A. a first mold 10 having a first cavity 11 and a second mold 20 having a second cavity 21 are prepared. Here, a gate 12 having a small width for injection of a high-temperature molten insulating molding resin 143 is provided in the first cavity 11 of the first mold 10. In addition, the cap plate 130 having the terminal hole 131 and the terminal part 140 coupled to the terminal hole 131, that is, the first area 141 and the second area 142, are positioned together between the first mold 10 and the second mold 20.

As illustrated in FIG. 2B, the high-temperature molten insulating molding resin 143 is injected to the first cavity 11 and the second cavity 21 with a high pressure through the gate 12. Here, since the first cavity 11 and the second cavity 21 are connected to each other, the insulating molding resin 143 injected into the first cavity 11 flows to the second cavity 21. Next, if temperatures of the first and second molds 10 and 20 are lowered, the insulating molding resin 143 is hardened. Therefore, the insulating molding resin 143 is applied to the top and bottom surfaces of the cap plate 130 near the terminal hole 131 as well as to the terminal hole 131 of the cap plate 130 to a constant thickness.

As illustrated in FIG. 2C, the cap plate 130, the first terminal part 140 and the second terminal part 150 are extracted from the first mold 10 and the second mold 20 to obtain the cap plate 130, the first terminal part 140 and the second terminal part 150, which are integrated with one another. That is to say, according to an embodiment of the present invention, the cap plate 130, the first terminal part 140 and the second terminal part 150 are integrated by an insert-molding process using the insulating molding resin 143, thereby simplifying a secondary battery assembling process. In other words, since the number of components constituting the first terminal part 140 and the second terminal part 150 is reduced, the secondary battery assembling process is simplified.

Figure 3A:
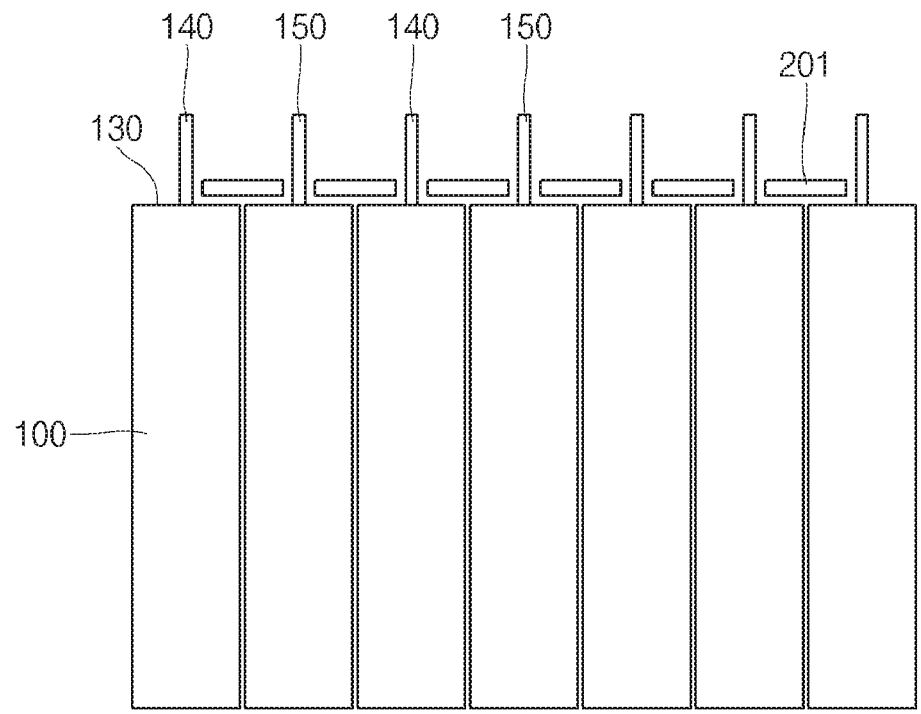
FIGS. 3A to 3C are schematic views illustrating an assembling method of a secondary battery module according to various embodiments of the present invention.
Figure 3B:
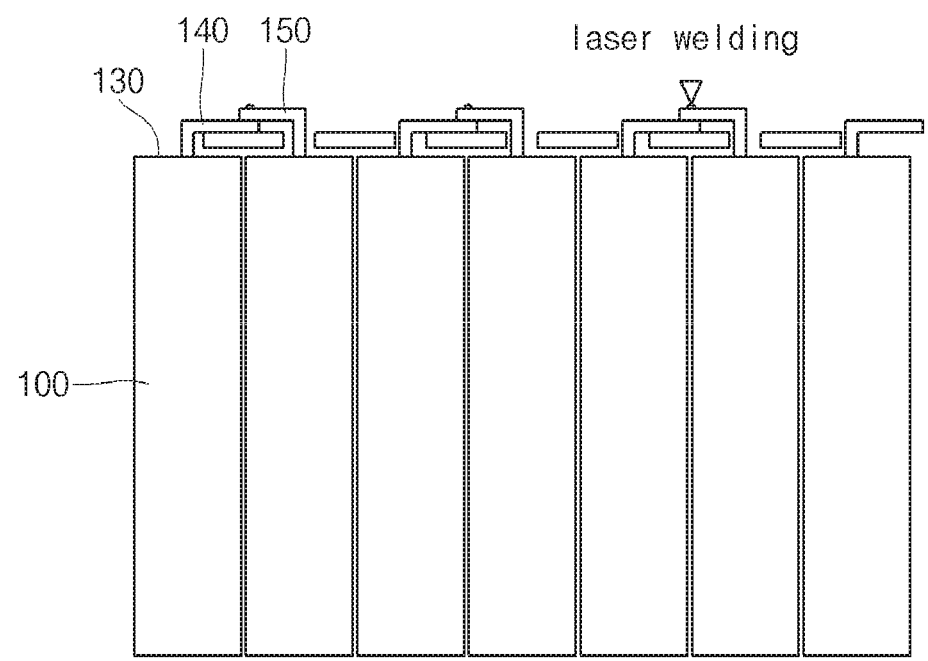
Figure 3C:
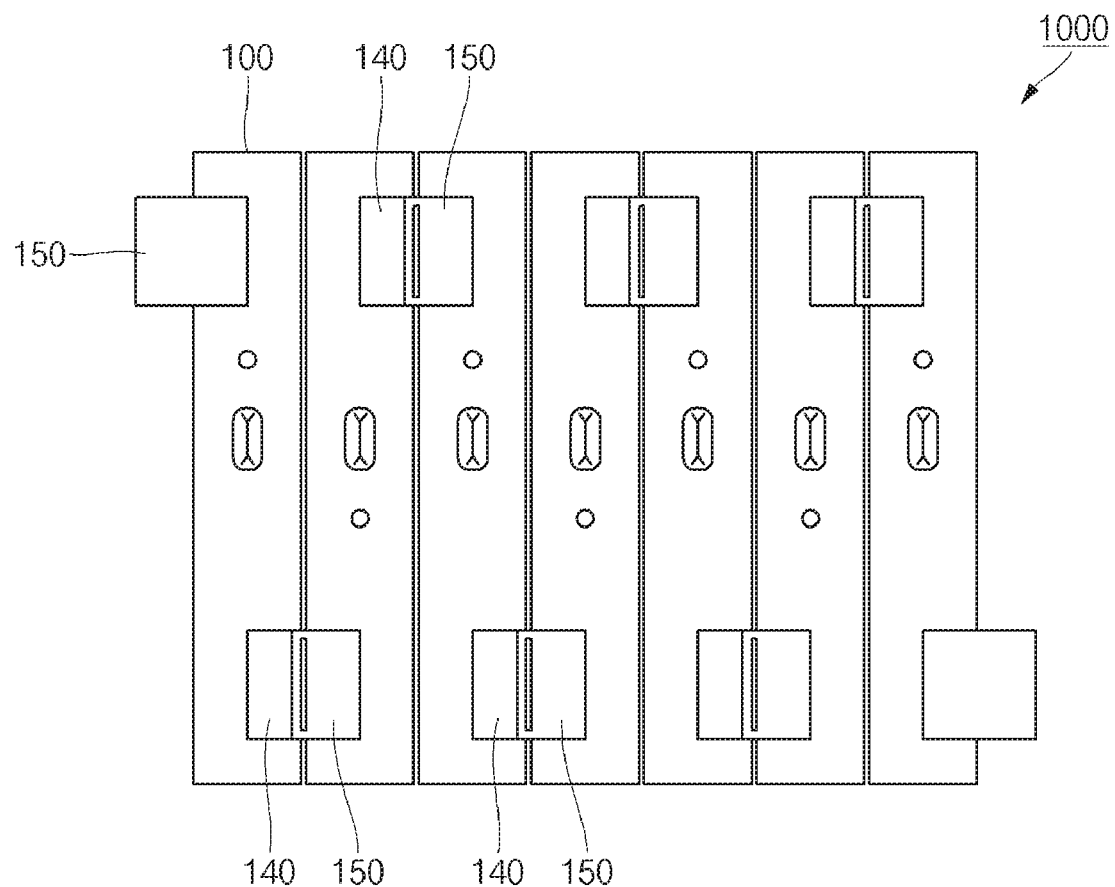

FIGS. 3A to 3C are schematic views illustrating an assembling method of a secondary battery module 1000 according to various embodiments of the present invention.

As illustrated in FIG. 3A, multiple secondary batteries 100 are first arranged in a horizontal direction. Here, first and second terminal parts 140 and 150 are extended from each of the secondary batteries 100 in an upwardly perpendicular direction with respect to the cap plate 130. A zig plate 201, which is not welded during welding, is positioned at a boundary region of the secondary batteries.

As illustrated in FIG. 3B, if first and second terminal parts 140 and 150 that are upwardly extended toward an upper portion of the cap plate 130 are positioned to face each other, some portions of the first and second terminal parts 140 and 150 are overlapped with each other. Here, the first terminal part 140 of a first-side secondary battery 100 and the second terminal part 150 of a second-side secondary battery 100 adjacent to the first-side secondary battery 100 are overlapped with each other while facing each other. The first terminal part 140 of the first-side secondary battery 100 and the second terminal part 150 of the second-side secondary battery 100, which are overlapped with each other, are subjected to, for example, but not limited to, laser welding, thereby allowing the adjacent secondary batteries 100 to be electrically connected to each other. Here, the welded first and second terminal parts 140 and 150 may have different polarities or the same polarity. After the welding, the jig plate 201 may be removed.

Finally, as illustrated in FIG. 3C, the terminal parts 140 and 150 of neighboring secondary batteries 100 are directly electrically connected to each other without requiring a bus bar, thereby providing the secondary battery module 1000.

Figure 4A:
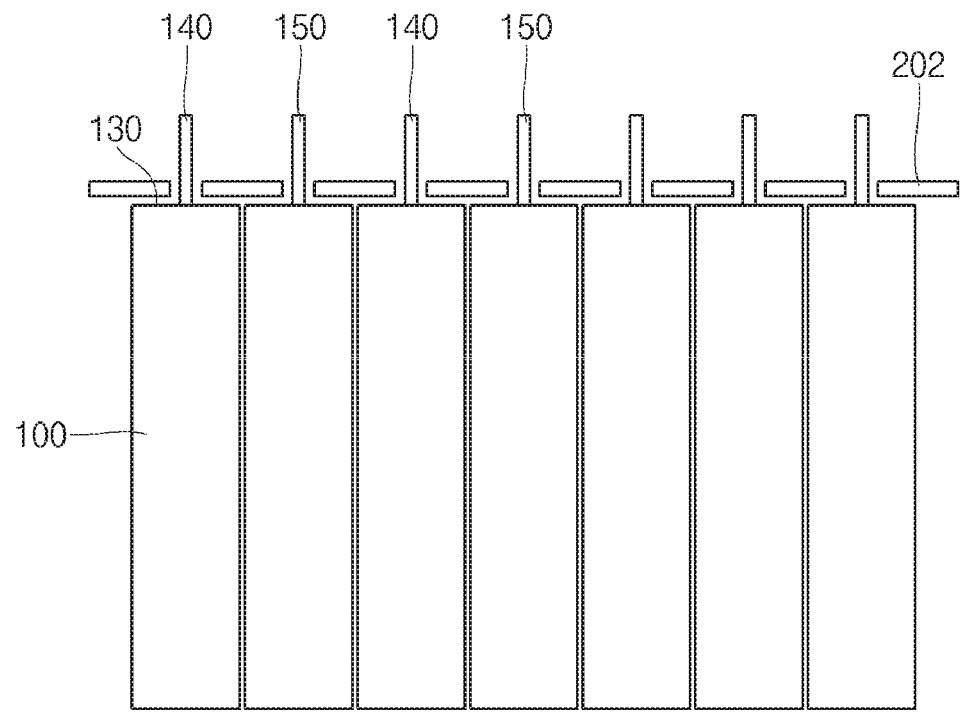
FIGS. 4A to 4C are schematic views illustrating an assembling method of a secondary battery module according to various embodiments of the present invention.
Figure 4B:
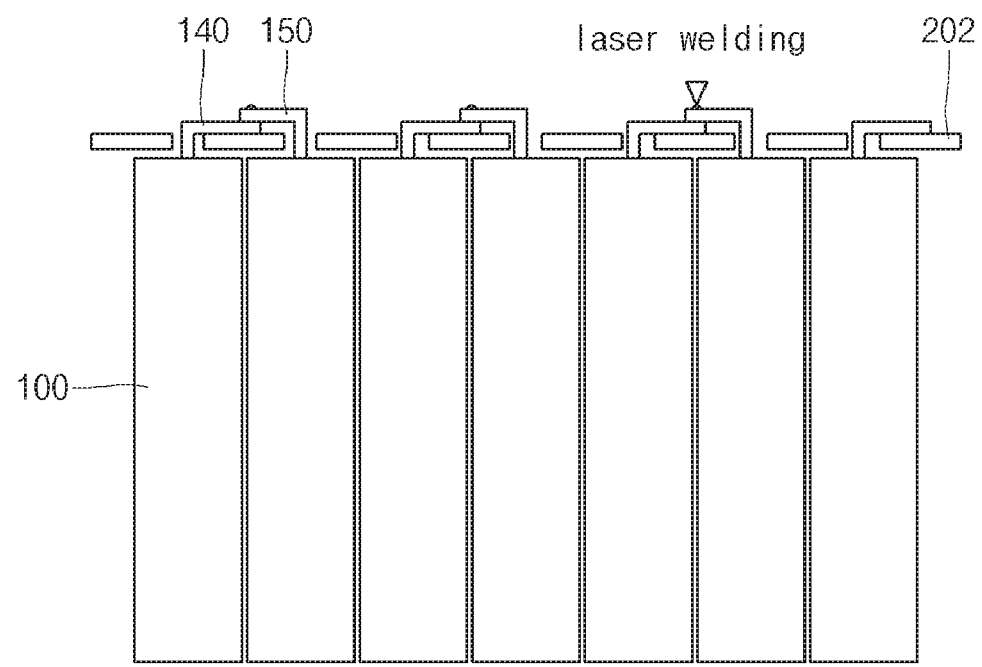
Figure 4C:
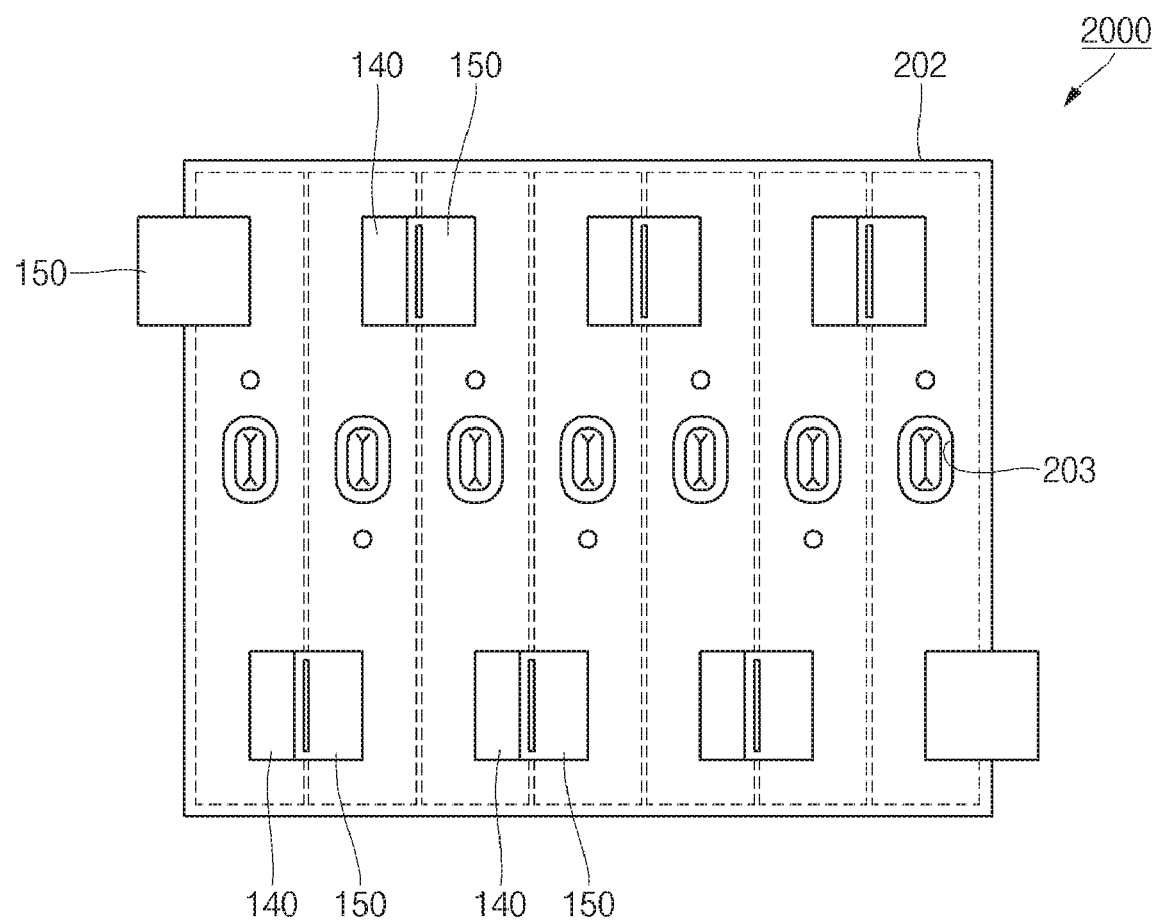

FIGS. 4A to 4C are schematic views illustrating an assembling method of a secondary battery module 2000 according to various embodiments of the present invention.

As illustrated in FIG. 4A, multiple secondary batteries 100 are first arranged in a horizontal direction. Here, first and second terminal parts 140 and 150 are extended from each of the secondary batteries 100 in an upwardly perpendicular direction with respect to the cap plate 130. An insulation plate 202, which is not welded during welding, is positioned at an upper region (a cap plate) of each secondary battery 100.

As illustrated in FIG. 4B, the first and second terminal parts 140 and 150 upwardly extended from the cap plate 130 are bent in a substantially horizontal direction. Here, the first terminal part 140 of a first-side secondary battery 100 and the second terminal part 150 of a second-side secondary battery 100 adjacent to the first-side secondary battery 100 are overlapped with each other. The first terminal part 140 of the first-side secondary battery 100 and the second terminal part 150 of the second-side secondary battery 100, which are overlapped with each other, are subjected to, for example, but not limited to, laser welding, thereby allowing the adjacent secondary batteries 100 to be electrically connected to each other. Here, the welded first and second terminal parts 140 and 150 may have different polarities or the same polarity.

Even after the welding, the insulation plate 202 may not be removed but may remain in the upper regions of the secondary batteries 100. Therefore, unnecessary electrical short circuits that may occur between each of the first and second terminal parts 140 and 150 and the cap plate 130 can be prevented.

As illustrated in FIG. 4C, the first and second terminal parts 140 and 150 of neighboring secondary batteries 100 are directly electrically connected to each other without requiring a bus bar, thereby providing the secondary battery module 2000. Here, the insulation plate 202 may remain on each of the secondary batteries 100 and may include a through-hole 203 located on a region corresponding to a safety vent of the secondary battery 100.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising
    an electrode assembly;
    a case for accommodating the electrode assembly;
    a cap plate coupled to the case; and
    a terminal part that is electrically connected to the electrode assembly and is extended to penetrate through the cap plate,
        wherein the terminal part comprises a first area that is electrically connected to the electrode assembly, the first area having a first thickness at a bent region inside of the case, and a second area having a second thickness that is thicker than the first thickness and is electrically connected to the first area, the second area having the second thickness outside of the case and being bendable so as to be parallel with the cap plate outside of the case, and wherein the first area includes a first hook area located at an end of the first area, the second area includes a second hook area located at an end of the second area, and the first hook area and the second hook area are coupled to each other inside of a terminal hole of the cap plate.

2. The secondary battery of claim 1, wherein the first and second areas are insulated from the cap plate by an insulating molding resin.

3. The secondary battery of claim 1, wherein the first area is bent in a C- or S-shaped configuration.

4. The secondary battery of claim 1, wherein the first area is connected to a single tab or multi-tabs extending from the electrode assembly.

5. The secondary battery of claim 1, wherein the second area is bent in parallel with the cap plate.

6. The secondary battery of claim 1, wherein the second area is bent in parallel with the cap plate and welded to a second area of another secondary battery.

7. The secondary battery of claim 6, wherein an insulation plate is positioned between the second area of the terminal part and the cap plate during and after welding of the second area of the terminal part to the second area of the another secondary battery.

\* \* \* \* \*